Figure 1:
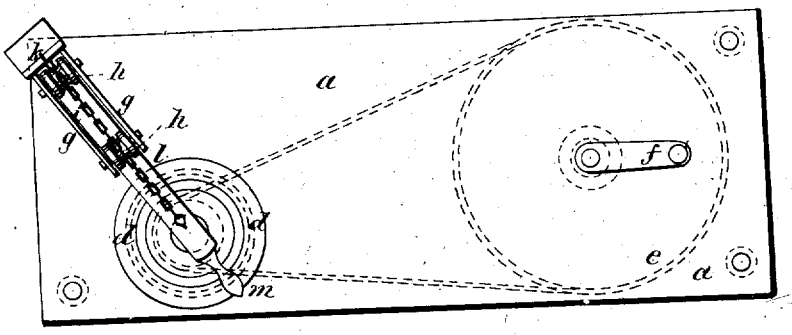

G. NIMMO.

Molding-Crucibles.

Reissued Dec. 8, 1874.

No. 6,166.

*Witnesses*

Jas. E. Sewell Jun.

Chas. H. Smith

*Inventor*

George Nimmo

UNITED STATES PATENT OFFICE.

GEORGE NIMMO, OF JERSEY CITY, NEW JERSEY, ASSIGNOR, BY MESNE ASSIGNMENTS, TO ARTHUR PICKERING, CHARLES R. VICKERY, CHARLES R. ATWOOD, AND PHŒNIX MANUFACTURING COMPANY.

IMPROVEMENT IN MOLDING CRUCIBLES.

Specification forming part of Letters Patent No. 49,140, dated August 1, 1865; reissue No. 6,166, dated December 8, 1874; application filed November 29, 1872.

*To all whom it may concern:*

Be it known that GEORGE NIMMO (then of Jersey City, in the county of Hudson and State of New Jersey) invented certain Improvements in Molding Crucibles, Letters Patent for which were granted August 1st, 1865, numbered 49,140, and assigned to ARTHUR PICKERING, of Boston, in the county of Suffolk, CHARLES R. VICKERY and CHARLES R. ATWOOD, both of Taunton, in the county of Bristol, and the PHŒNIX MANUFACTURING COMPANY, (a corporation duly established under the laws of the State of Massachusetts, and having its principal place of business at Taunton, aforesaid,) all in the said State of Massachusetts.

Long prior to said NIMMO's invention the mode of manufacturing certain articles of pottery by means of a rib or former to give the desired shape to the inside of the article, and a revolving plaster vessel to properly present the "ball" (as the lump of tempered clay is called) to and support it under the action of the rib, was well known; but this mode of manufacture was not applicable in the manufacture of crucibles, because the apparatus was such that the crucible would be injured or destroyed in removing the rib, by the end of the rib striking the upper part of the crucible, as will be plain to all skilled in the art of crucible-making, and acquainted with the mode of manufacture above referred to.

Another mode of manufacturing certain articles of pottery-ware by means of a rib or former for the inside of the article, and a revolving table (a common potter's wheel) which partially presented the ball to and supported it under the action of the rib, the workman using his hands to aid in presenting the ball to and supporting it under the action of the rib, is described in a French work published in 1857, entitled "Lecons de Ceramique," par M. A. Salvetat, volume second, pages 121–2. This last-named mode of manufacture was applicable to the manufacture of crucibles, the apparatus being such that the rib was guided so as to cause it to approach the axis of the pot, where it was necessary that it should do so in order to prevent injury to the pot; but, even if useful at all in that manufacture, it is without doubt very much inferior to the mode of manufacture invented by NIMMO, and hereinafter described, the distinguishing difference between them being that the ball is presented to the rib and supported under its action, not by a flat revolving metal disk, but by a vessel made of plaster, which takes the place of both the flat revolving disk and the workman's hands, performing all the functions performed by this disk and the hands of the workman, but in a much more perfect manner and in less time.

The invention of said NIMMO is, in fact, an improvement on the mode of manufacture, as well as on the apparatus, described in Salvetat's work, the improvement consisting in the different mode of presenting and supporting the ball; but we do not wish to be understood as claiming this mode of presenting and supporting the ball as the invention of said NIMMO, as his improved mode of manufacture is new solely because it is, as a whole, substantially different from the mode described by Salvetat, and from the mode first above referred to; indeed, as a short general description of NIMMO's improved mode, it may be said to be substantially the same as that described by Salvetat so far as shaping the inside of the crucible is concerned, and substantially the same as the mode first above referred to, so far as presenting the ball to and supporting it under the action of the rib is concerned. By NIMMO's improved mode of manufacture much labor and expense are saved, and, what is still more important, crucibles are produced which are superior to those made by any practical mode known prior to said NIMMO's invention, in many very important respects.

Figure 2:
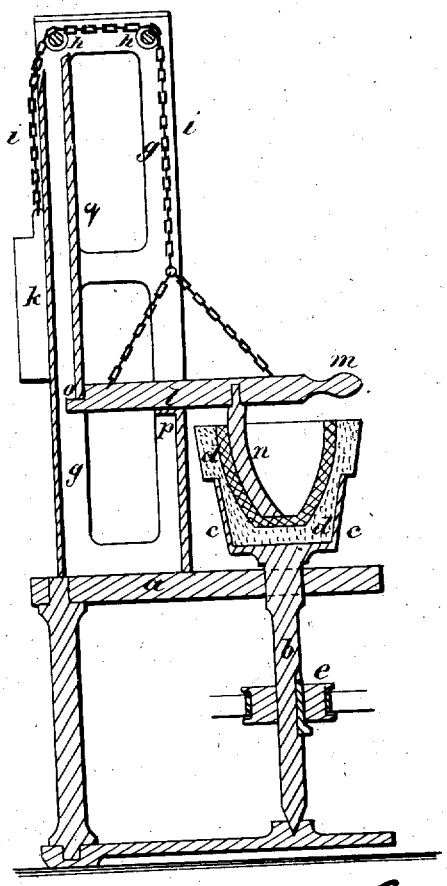

Figure 1 is a plan, and Fig. 2 is a sectional elevation, of the best form of apparatus known to said NIMMO for practicing his improved mode of manufacture.

In these drawings, *a* is a bed carrying the vertical spindle *b*, on the upper end of which is the hollow chuck *c*, into which the plaster mold *d* fits, and these parts are revolved by a belt to a wheel, *e*, and crank. (See Fig. 1.)

Near the chuck *c* is an upright frame, *g*, with rollers *h h*, over which the chain *i* passes, on one end of which is the counter-weight *k*, and on the other the lever *l*, having a handle, *m*, at one end, and carrying rib *n*. This lever *l* is guided by the uprights *g g* and cross-piece *q*, and, when not in use, is drawn up by the weight *k*. The rib *n* can always be brought into precisely the same relation to the axis of revolution of mold *d*; consequently crucibles can be thus manufactured with very great uniformity. The material is also compressed between the rib and the supporting-vessel, and the inside of the crucible is smoothed by the smooth surface of metal which constitutes the working-face of the rib. The stop *p* arrests the motion of the lever, when fulcrumed at *o*, as soon as the working-face of the rib is brought into the desired relation with the axis of revolution of the mold—that is, as soon as the crucible is shaped. In all these respects this apparatus does not differ from that first above mentioned. The rib must then be withdrawn, and, to prevent its marring the interior of the crucible, it must be so guided that it will travel in a path materially different from that of the rib in the apparatus first above described, and substantially the same as that of the rib in Salvetat's apparatus. For this purpose the lever *l* is hung, by the chain *i*, between two uprights, *g g*, so that when it is drawn outward until its end clears the cross-piece *q* it may be readily lifted bodily, and guided, by the cross-piece *q* and the uprights *g g*, in such a way that the rib will not strike against the interior of the crucible. The mold *d*, with the crucible in it, is then taken from the chuck and a second mold substituted. The crucible will soon shrink, so that it can be removed from the plaster vessel, when it is to be finished in the usual manner.

We disclaim, as the invention of said NIMMO, both the modes and both the apparatus above mentioned, and we also distinctly disclaim any and all modes of manufacture which can be carried on by any apparatus which lacks either the mechanism for guiding the rib in the manner above described, or the vessel for presenting and supporting the ball, as above described, said NIMMO's invention residing wholly in the combined use of both these features.

What we do claim as the invention of said NIMMO is—

The improved apparatus above described, having the specific character, objects, and functions above explained, and consisting of the rib, the revolving mold, and the mechanism by which the rib is guided toward the axis of revolution of the mold as it is withdrawn, as set forth, these elements being claimed only in combination each with all the others, and no claim is made to any combination of any of them less than the whole.

ARTHUR PICKERING.
C. R. VICKERY.
CHAS. R. ATWOOD.
PHŒNIX MANUFG. CO.,
By C. R. VICKERY, *Pres't.*

Witnesses to A. P.:
J. E. MAYNADIER,
J. E. KNOX.

Witnesses to C. R. V. and C. R. A.:
B. C. VICKERY,
EDWARD KING.